A. J. BEICH.
POWER TRANSMITTING BELT.
APPLICATION FILED SEPT. 4, 1919.

1,344,475.

Patented June 22, 1920.

Inventor—
Albert J. Beich.
by his Attorneys
Howson & Howson

UNITED STATES PATENT OFFICE.

ALBERT J. BEICH, OF CAMDEN, NEW JERSEY.

POWER-TRANSMITTING BELT.

1,344,475.  Specification of Letters Patent.  Patented June 22, 1920.

Application filed September 4, 1919. Serial No. 321,540.

*To all whom it may concern:*

Be it known that I, ALBERT J. BEICH, a citizen of the United States, residing in Camden, New Jersey, have invented Power-Transmitting Belts, of which the following is a specification.

One object of my invention is to provide a driving belt of the link type which shall be durable, incapable of stretching and in which the elements shall be so constructed and held together as to permit of their convenient removal and insertion;—the invention further contemplating an arrangement of parts which may be quickly and conveniently assembled or separated and which, while possessing the gripping or holding qualities of material such as leather, shall possess the characteristic strength and permanency of an all-metallic belt.

These objects and other advantageous ends I attain as hereinafter set forth, reference being had to the accompanying drawings, in which, Figure 1 is a side elevation of a portion of a belt constructed in accordance with my invention;

Figure 3:
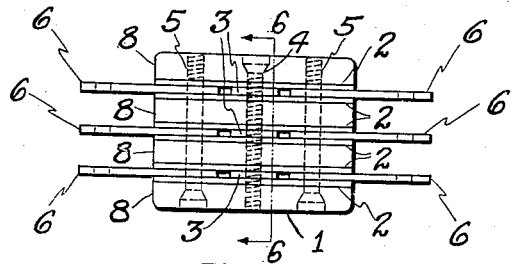
Fig. 3 is a plan of a portion of a belt similar to that shown in Fig. 2, in which the friction and link elements have been increased in number to increase the capacity of the belt.

In accordance with the simplest form of my invention I provide a chain or belt structure consisting of a succession of pairs of elongated metallic plates 2 each connected to an adjacent pair by a single elongated metal plate 6. Each of these plates 2 has mounted on its outer face a friction element in the form of a plate 1 of leather and the elements of each pair of plates are held in place by machine screws countersunk in one of them from which it passes through the two metallic link plates 2 and is threaded into the second of the friction elements 1. Each of the screws 5 also serves as a pivot or pintle whereby one of the single link plates 6 is pivotally connected to an adjacent pair of link plates 2.

In order to further connect the friction elements 1 of each pair and their coöperating link plates 2, I countersink a third screw 4 in the middle of one of said friction elements and thread it not only into the second friction element of its pair but also thread it into the two link plates 2 through which it passes. In order to prevent these latter from being drawn together by said screw and for the purpose of properly spacing them I mount between the middle portions of each pair of link plates a spacing plate 3 which it is to be noted has through it an opening, threaded to receive the machine screw 4.

Figure 2:
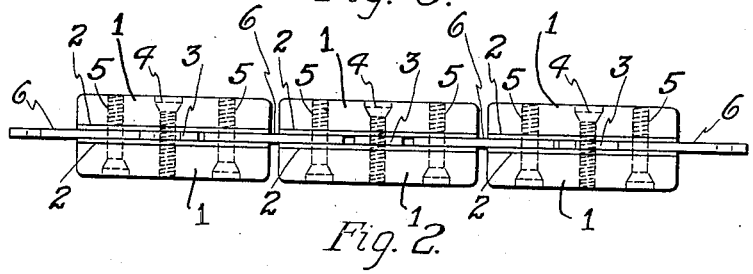
Fig. 2 is a plan of the belt shown in Fig. 1.
Figure 1:
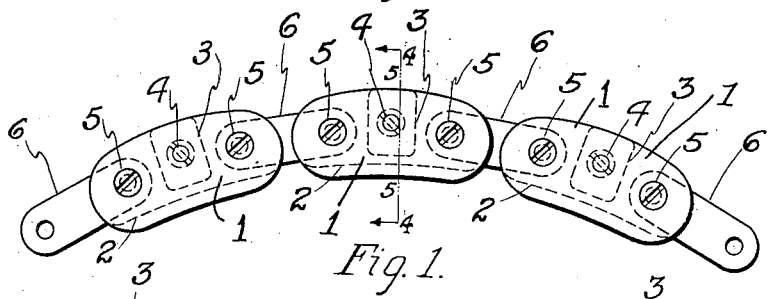
Figure 4:
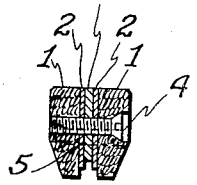
Fig. 4 is a transverse vertical section on the line 4—4, Fig. 1.
Figure 6:
Fig. 6 is a transverse vertical section on the line 6—6, Fig. 3.
Figure 5:
Fig. 5 is a transverse section of a slightly modified form of the invention.

As clearly indicated in Figs. 1 and 4, the bearing edges or sides of the friction elements 1 project beyond or overhang the adjacent edges or sides of the metallic link plates 2 and their outer edges may be beveled as shown in Fig. 4, may be rounded as shown in Fig. 5, or may be plane as in Fig. 6. If desired a belt of practically any capacity may be provided by increasing its transverse width as indicated in Figs. 3 and 6, for which purpose one of the friction elements of a belt such as that of Fig. 2 would have mounted against its outer face another pair of link plates 2 which in turn would have mounted upon its outer face one or any desired number of sets of link plates and friction elements.

As in the simpler form of the invention however, the elements of each of these units have their end portions connected by a pair of screws 5 whose heads are countersunk in one of the outermost friction elements and whose threaded extremities are screwed into the other of the outermost friction elements while serving as the pivot or pintle for the attachment of the single link plates 6. As before, each pair of the link plates 2 has mounted between its central portions a metallic spacer plate 3 of the same thickness as the single link plates 6 and there is provided a screw 4 threaded for its entire length to coöperate with threads in all of the structures through which it passes so as to rigidly connect them. As in the case shown in Fig. 1, the head of the screw 4 is preferably countersunk in that one of the outer friction elements into which the ends of the pivot screws 5 are threaded.

From the above description it will be appreciated that the belt may be opened at any desired point with the utmost speed and convenience, merely by removing one of the screws 5 and one or any number of the unit link structures may be conveniently taken out of the belt by similarly removing a second one of said screws 5;—the speed of this operation being materially increased by reason of the small number of threads on the extremity of each of the screws 5 which pass loosely through all of the elements except one of the outermost friction elements.

I claim:

The combination in a power transmission belt of unit link structures each consisting of a pair of elongated metal link plates; a metal spacing plate between the middle portions of said link plates; friction elements respectively mounted on the outer faces of the link plates and each projecting beyond one side of its associated plate; said link plates, spacing plate, and friction elements having screw threaded openings therein; a screw passing through and having threads coacting with the threads of the said openings to rigidly connect the parts; metal link elements extending between the pairs of link plates of adjacent belt units; with pivot members each passing loosely through all of the elements except one of the friction elements and threaded into said element for movably connecting the link elements and the belt units in a belt.

In witness whereof I affix my signature.

ALBERT J. BEICH.